(No Model.)

N. C. BASSETT.
BALL THRUST BEARING.

No. 508,670. Patented Nov. 14, 1893.

WITNESSES.
Alec F. Macdonald.
A. C. Orne

INVENTOR.
Norman C. Bassett
by Bartley & Blodgett
Attys

THE NATIONAL LITHOGRAPHING COMPANY,
WASHINGTON, D. C.

UNITED STATES PATENT OFFICE.

NORMAN C. BASSETT, OF LYNN, MASSACHUSETTS, ASSIGNOR TO THE THOMSON-HOUSTON ELECTRIC COMPANY, OF CONNECTICUT.

BALL THRUST-BEARING.

SPECIFICATION forming part of Letters Patent No. 508,670, dated November 14, 1893.

Application filed July 18, 1892. Serial No. 440,302. (No model.)

*To all whom it may concern:*

Be it known that I, NORMAN C. BASSETT, a citizen of the United States, residing at Lynn, county of Essex, State of Massachusetts, have invented a certain new and useful Improvement in Ball Thrust-Bearings, of which the following is a specification.

My invention relates to ball bearings for shafts, especially for the thrust bearings of the screw shafts of electric elevators.

The object of the invention is to provide a ball thrust bearing in which any number of rows of balls may be used, and each row will sustain the thrust in either and both directions.

The invention consists in certain details of construction hereinafter set forth and particularly pointed out in the claims.

Figure 1:
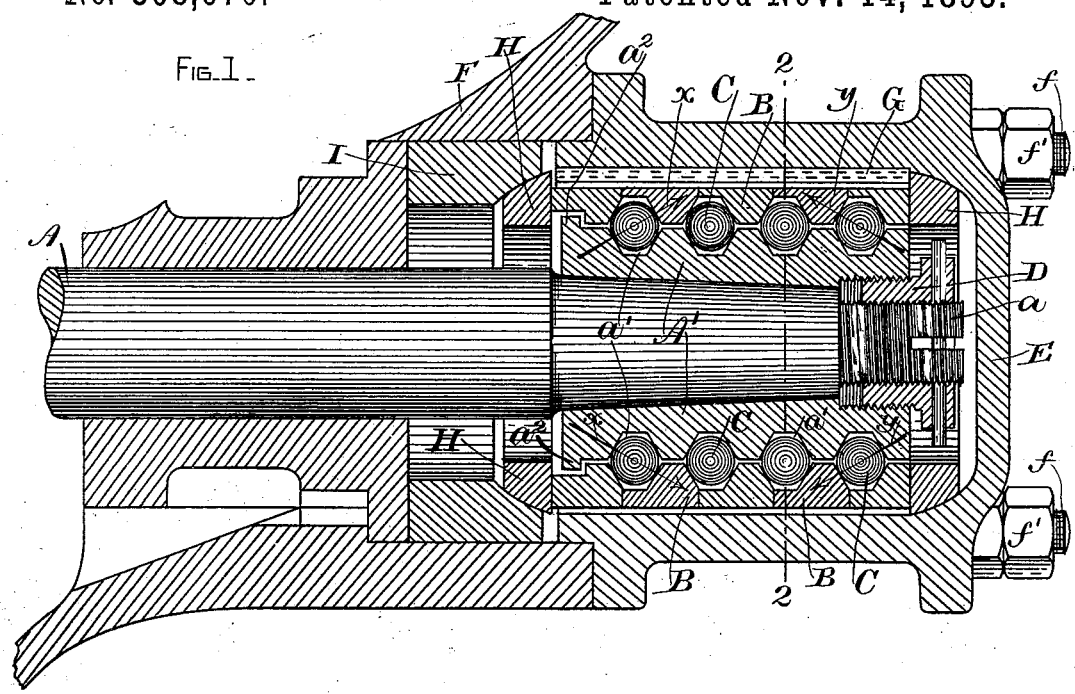
Figure 2:
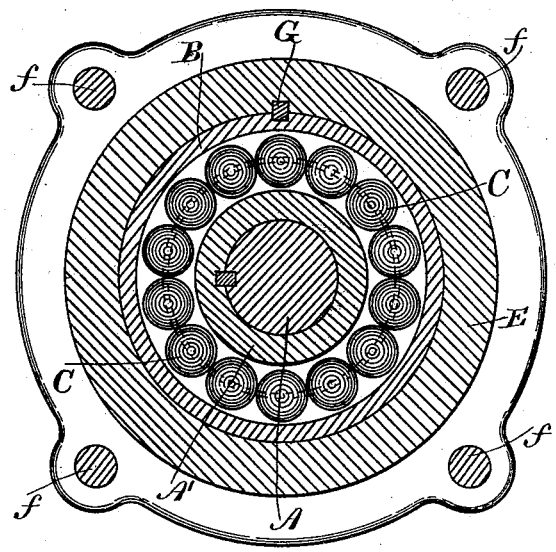

In the drawings Figure 1 is a longitudinal central section of a portion of a shaft and my improved bearing. Fig. 2 is a cross section on the line 2—2, Fig. 1.

In the shaft A, or preferably in a sleeve A' surrounding the shaft, are formed a number of parallel circumferential grooves $a'$ preferably V-shaped. Surrounding the sleeve which with the shaft constitutes the revolving portion of the device is a series of rings B, one edge of which is beveled, and the other edge rabbeted, the rabbet of one ring forming with the beveled edge of the next ring a V-shaped groove $a'$. A row of balls C is placed in each groove. The sleeve, when one is used, is keyed to the shaft, being held upon or removed from the tapering end of the shaft by a differential nut D engaging with a threaded neck $a$ on the shaft and with a threaded portion of the base of the sleeve A'. The rings B are inclosed in a cap E, which is screwed to the frame F of the machine by screw studs $f$ and nuts $f'$. A key G interlocks the rings and the cap and prevents the rings from turning with the shaft.

The sleeve, balls and rings can be assembled, and then slipped bodily upon the shaft, and secured by the nut. To assemble them, the sleeve is held upright, with the shoulder $a^2$ at the bottom. The first ring is dropped upon the shoulder. Then a row of balls is put into the groove; then another ring, and so on. Any number of rings and grooves may be used. The end rings preferably bear against swivel collars H, which have spherical bearings to allow the rings to adjust themselves so as to bring an even bearing on all the balls. The outer collar has a bearing on the inside of the cap. The inner collar may have a bearing on the frame F, or on an annular block or collar I, the purpose of which is to bring the entire thrust bearing well outside of the frame, to give easy access to the various parts for examination and repair.

When the thrust is toward the right in Fig. 1, the resultant pressure on the balls is in the direction of the arrows $x$. When the thrust is in the opposite direction, the resultant pressure is in the line of the arrows $y$. Hence each set of balls serves to resist the thrust in both directions.

What I claim as new, and desire to secure by Letters Patent, is—

1. A thrust bearing, consisting of a revolving portion containing a number of V-shaped grooves, a stationary portion composed of a series of rings, each having a beveled edge and a rabbeted edge, forming V-shaped grooves, and rows of balls received in said grooves, substantially as described.

2. A thrust bearing consisting of a revolving portion having a number of grooves, a stationary portion composed of a series of rings having inclined faces, rows of balls held between the grooves and said inclined faces, and swivel collars at each end of the series of rings, said collars having spherical bearings, substantially as described.

3. A thrust bearing consisting of the combination with a shaft of a sleeve keyed thereto, having a shoulder at one end, and containing a number of grooves, a series of abutting rings one of which is adapted to abut against said shoulder, and rows of balls held in said grooves by said rings, substantially as described.

4. The combination with a shaft carrying a grooved sleeve, of a series of rings having beveled and rabbeted edges, rows of balls held by said rings in the grooves, a swivel collar at each end of the series of rings, a cap having a spherical bearing for the outer collar, and an annular block having a spherical bearing for the inner collar, substantially as described.

In witness whereof I have hereunto set my hand this 15th day of July, 1892.

NORMAN C. BASSETT.

Witnesses:
JOHN W. GIBBONEY,
ALEC F. MACDONALD.